US011903100B2

(12) United States Patent
Li et al.

(10) Patent No.: US 11,903,100 B2
(45) **Date of Patent: *Feb. 13, 2024**

(54) ELECTRONIC CIGARETTE, ATOMIZER AND HEATING ASSEMBLY THEREOF

(71) Applicant: SHENZHEN SMOORE TECHNOLOGY LIMITED, Shenzhen (CN)

(72) Inventors: Xiaoping Li, Shenzhen (CN); Changyong Yi, Shenzhen (CN); Zhenlong Jiang, Shenzhen (CN); Hongliang Luo, Shenzhen (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/970,530

(22) Filed: Oct. 20, 2022

(65) Prior Publication Data

US 2023/0042998 A1 Feb. 9, 2023

Related U.S. Application Data

(62) Division of application No. 16/595,513, filed on Oct. 8, 2019, now Pat. No. 11,589,428.

(30) Foreign Application Priority Data

Oct. 8, 2018 (CN) ......................... 201821629648.5

(51) Int. Cl.

*A24F 40/44* (2020.01)
*H05B 3/26* (2006.01)

(Continued)

(52) U.S. Cl.

CPC ............. *H05B 3/265* (2013.01); *A24F 40/44* (2020.01); *H05B 3/06* (2013.01); *H05B 3/42* (2013.01);

(Continued)

(58) Field of Classification Search

None

See application file for complete search history.

(56) References Cited

U.S. PATENT DOCUMENTS 4,035,613 A * 7/1977 Sagawa .................... H05B 3/18 219/535
4,882,203 A 11/1989 Witmer (Continued)

FOREIGN PATENT DOCUMENTS

CN 108125276 6/2018
CN 108185536 6/2018

(Continued)

OTHER PUBLICATIONS

"Notice of Allowance of U.S. Appl. No. 16/595,513," dated Jul. 12, 2022, pp. 1-13.

(Continued)

*Primary Examiner* — Tho D Ta
(74) *Attorney, Agent, or Firm* — JCIP GLOBAL INC.

(57) ABSTRACT

The invention relates to an electronic cigarette, an atomizer and a heating assembly thereof, wherein the heating assembly is used for the atomizer and includes an adsorption member, and at least one heating element for generating heat when electrified. The adsorption member comprises at least one surface defining at least one fixing groove therein, and the at least one heating element is disposed in the at least one fixing groove. The heating element is disposed in the fixing groove, so that the aerosol-generating substrate on the adsorption member can be more sufficiently coated on the (Continued)

heating element and dispersed to an outer surface of the heating element, preventing dry burning on the surface of the heating element; moreover, the amount of the aerosol-generating substrate heated and atomized by the heating element is increased, and so does the amount of aerosol generated by the heating element.

17 Claims, 2 Drawing Sheets

(51) Int. Cl.

| | |
|---|---|
| ***H05B 3/06*** | (2006.01) |
| ***H05B 3/42*** | (2006.01) |
| *A24F 40/10* | (2020.01) |

(52) U.S. Cl.

CPC ........ *A24F 40/10* (2020.01); *H05B 2203/021* (2013.01)

(56) References Cited

U.S. PATENT DOCUMENTS

| | | | | |
|---|---|---|---|---|
| 10,159,114 | B2 * | 12/2018 | Everly | F24D 13/022 |
| 11,589,428 | B2 * | 2/2023 | Li | A24F 40/44 |
| 2017/0027227 | A1 * | 2/2017 | Lipowicz | A61M 11/042 |
| 2017/0238609 | A1 * | 8/2017 | Schlipf | H05B 3/04 |
| 2017/0325510 | A1 * | 11/2017 | Hu | A24F 40/50 |
| 2019/0223504 | A1 * | 7/2019 | Chen | A24F 40/485 |

FOREIGN PATENT DOCUMENTS

| | | | | | |
|---|---|---|---|---|---|
| CN | 108308715 | | | 7/2018 | |
| CN | 108308716 | | | 7/2018 | |
| DE | 202015105700 | U1 | * | 12/2015 | H05B 3/24 |
| GB | 2202418 | A | * | 9/1988 | F24D 13/022 |
| GB | 2324014 | A | * | 10/1998 | F24H 1/121 |
| WO | WO-2018018599 | A1 | * | 2/2018 | A24F 40/42 |

OTHER PUBLICATIONS

"Notice of Allowance of U.S. Appl. No. 16/595,513," dated Nov. 30, 2022, pp. 1-11.

"Search Report of Europe Related Application, application No. 19200543.7", dated Dec. 3, 2019, p. 1-p. 6.

"Intention to grant of Europe Related Application, application No. 19200543.7", dated Sep. 25, 2020, p. 1-p. 7.

"Text intended for the grant of Europe Related Application, application No. 19200543.7", dated Sep. 25, 2020, p. 1-p. 13.

"Decision to grant of Europe Related Application, application No. 19200543.7", dated Dec. 10, 2020, p. 1-p. 2.

* cited by examiner

ELECTRONIC CIGARETTE, ATOMIZER AND HEATING ASSEMBLY THEREOF

CROSS-REFERENCE TO RELATED APPLICATION

This application is a divisional application of and claims the priority benefit of U.S. patent application Ser. No. 16/595,513, filed on Oct. 8, 2019, now allowed, which claims the priority benefit of China application serial no. 201821629648.5, filed on Oct. 8, 2018. The entirety of each of the above-mentioned patent applications is hereby incorporated by reference herein and made a part of this specification.

FIELD

The invention relates to the field of cigarette substitutes, in particular to an electronic cigarette, an atomizer and a heating assembly thereof.

BACKGROUND

Electronic cigarettes, also known as virtual cigarettes or electronic atomizers, served as a substitute for cigarettes, are mainly used for quitting smoking. Electronic cigarettes have an appearance and taste similar to cigarettes, but are generally free of harmful components such as tar, suspended particulates and the like in cigarettes.

An electronic cigarette is mainly composed of an atomizer and a power supply assembly, and the atomizer generally comprises a heating assembly. At present, the heating assembly in some embodiments usually includes a fiber rope for adsorbing aerosol-generating substrate and a heating wire wound on the fiber rope, and since the fiber rope and the heating wire are made of flexible materials, the problem of mounting and fixing then becomes complicated.

In other embodiments, the heating assembly usually includes a porous element and a heating track, the porous element is provided with an atomizing surface, and the heating track is disposed on the atomizing surface. Since the heating track is generally formed by silk-screen printing and the like, typically, the heating track has only one surface in contact with the atomizing surface of the porous element, resulting in a small contacted area therebetween and thus poor atomizing efficiency.

SUMMARY

The technical problem to be solved by the invention is to provide an electronic cigarette, an atomizer and a heating assembly thereof.

The technical solution adopted by the invention to solve the technical problem is as follows: the invention discloses a heating assembly, including an adsorption member, and at least one heating element for generating heat when electrified; and the adsorption member includes at least one surface defining at least one fixing groove therein, and the at least one heating element is disposed in the at least one fixing groove.

Preferably, the heating element is higher than an outer edge of the fixing groove; or the heating element is flush with an outer edge of the fixing groove; or the heating element is lower than an outer edge of the fixing groove.

Preferably, the adsorption member is a porous substrate, and the porous substrate is a porous ceramic.

Preferably, minute voids in the porous ceramic have pore diameters ranging from 1 μm to 100 μm and an average pore diameter of 10 μm to 35 μm; and a volume of the minute voids having pore diameters of 5 μm to 30 μm in the porous ceramic accounts for more than 60% of a volume of all the minute voids in the porous ceramic.

Preferably, minute voids in the porous ceramic have an average pore diameter of 20 μm to 25 μm.

Preferably, a volume of minute voids having a pore diameter of 10-15 μm in the porous ceramic accounts for 20% or more of the volume of all the minute voids in the porous ceramic; a volume of minute voids having a pore diameter of 30-50 μm in the porous ceramic accounts for 20% to 40% of the volume of all the minute voids in the porous ceramic; and a porosity of the porous ceramic is 30% to 70%.

Preferably, the heating element includes a first straight section, a second straight section, and a connecting section connected and bent between one end of the first straight section and one end of the second straight section.

Preferably, a side surface of the adsorption member where the heating element located is in a longitudinal shape, the first straight section and the second straight section extend in the same direction, which is the longitudinal direction of the side surface of the adsorption member where the heating element located.

Preferably, an end portion of the first straight section opposite to the connection section and an end portion of the second straight section opposite to the connection section are connected to a power, respectively.

Preferably, a first electrode is connected to the end portion of the first straight section opposite to the connecting section, a second electrode is connected to the end portion of the second straight section opposite to the connecting section, and the first electrode and the second electrode are respectively positioned on two opposite sides in the longitudinal direction of the side surface of the adsorption member where the heating element is located.

Preferably, the connecting section includes a curved segment in a curved shape and a straight segment in a straight shape; the connecting section includes at least one curved segment and at least one straight segment, and each of the curved segment and the straight segment is sequentially connected to form the connecting section.

Preferably, the number of the at least one heating element is one, and the number of the at least one fixing groove is one; the heating element fills the fixing groove.

Preferably, the shape and dimension of the at least one fixing groove are matched with that of the at least one heating element.

An atomizer, including the heating assembly according to any one of the preceding paragraphs.

An electronic cigarette, including the atomizer.

According to the electronic cigarette, the atomizer and the heating assembly thereof of the present invention, the following beneficial effects can be achieved: the heating element is disposed in the fixing groove, so that the aerosol-generating substrate on the adsorption member can be coated on the heating element more sufficiently, and dispersed to an outer surface of the heating element, preventing dry burning on the surface of the heating element; moreover, the amount of the aerosol-generating substrate heated and atomized by the heating element is increased, and so does the amount of aerosol generated by the heating element.

BRIEF DESCRIPTION OF THE DRAWINGS

The present invention will be further described with reference to the accompanying drawings and examples, in the drawings.

DETAILED DESCRIPTION OF THE INVENTION

In order that to render a more apparent understanding of technical features, objects, and effects of the present invention, specific embodiments thereof will be described in detail with reference to the accompanying drawings.

Figure 1:
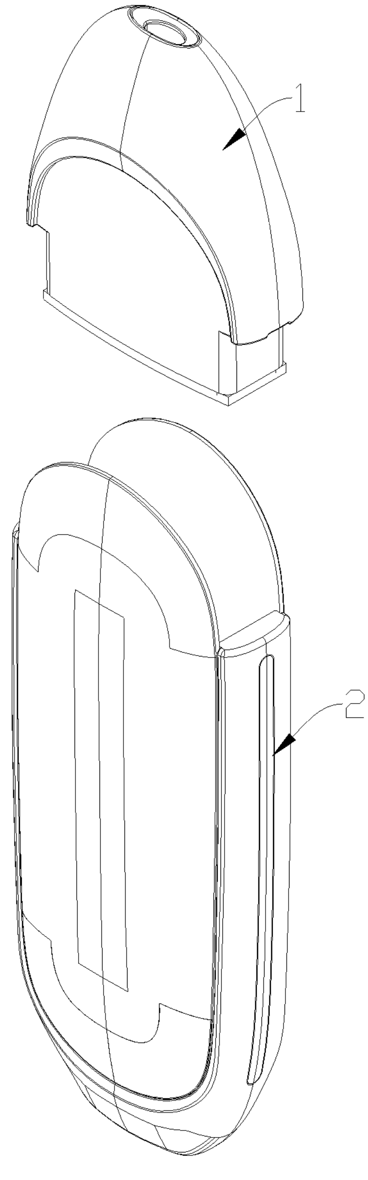
FIG. 1 is a schematic view showing an exploded structure of an atomizer and a power supply assembly of an electronic cigarette in an embodiment of the present invention.
Figure 2:
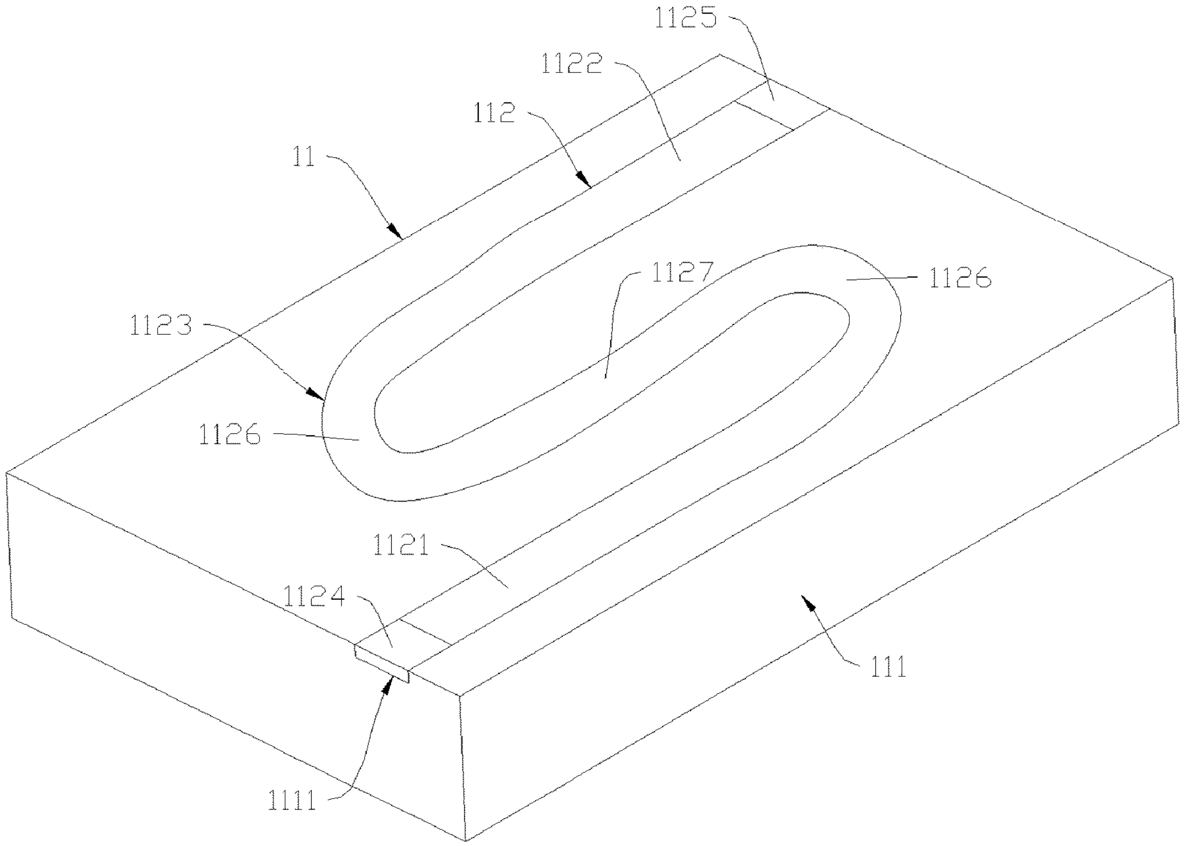
FIG. 2 is a schematic structural view of a heating assembly of the atomizer of FIG. 1.

As shown in FIGS. 1 and 2, an electronic cigarette in a preferred embodiment of the invention includes an atomizer 1 and a power supply assembly 2. When the atomizer 1 and the power supply assembly 2 are assembled, the power supply assembly 2 supplies power to a heating element 112 of a heating assembly 11 of the atomizer 1, and the heating element 112 heats and atomizes aerosol-generating substrate (usually a liquid) when being heated, for a user to inhale.

The heating assembly 11 includes an adsorption member 111 that can adsorb the aerosol-generating substrate, and a heating element 112 that generates heat when electrified. A surface of the adsorption member 111 is provided with a fixing groove 1111 in which the heating element 112 is disposed.

After the adsorption member 111 adsorbs the aerosol-generating substrate, the heating element 112 heats and atomizes the aerosol-generating substrate on the adsorption member 111 into aerosol under the condition of being electrified. The heating element 112 is disposed in the fixing groove 1111, so that the aerosol-generating substrate on the adsorption member 111 can be more sufficiently coated on the heating element 112 and dispersed to an outer surface of the heating element 112, preventing dry burning on the surface of the heating element 112, moreover, the amount of the aerosol-generating substrate heated and atomized by the heating element 112 is increased.

In this embodiment, the heating element 112 is disposed at one side of the adsorption member 111. In other embodiments, the heating element 112 may be disposed at multiple sides of the adsorption member 111.

Furthermore, the adsorption member 111 is a porous substrate, so that the adsorption amount can be increased, and the aerosol-generating substrate can be transferred inside the adsorption member 111. Preferably, the porous substrate is a porous ceramic which can sufficiently adsorb the aerosol-generating substrate.

Preferably, the heating element 112 fills the fixing groove 1111, so that the aerosol-generating substrate on the adsorption member 111 can flow and disperse from an edge of the heating element 112 to a surface of the heating element 112, thereby avoiding dry burning.

In some embodiments, the heating element 112 is higher than an outer edge of the fixing groove 1111 but may not necessarily be too much higher, so as to facilitate spreading of the aerosol-generating substrate to the outer surface of the heating element 112. In other embodiments, the heating element 112 may be in flush with the outer edge of the fixing groove 1111; alternatively, the heating element 112 is lower than the outer edge of the fixing groove 1111 to facilitate spreading of the aerosol-generating substrate to the outer surface of the heating element 112.

Furthermore, in some embodiments, the heating element 112 includes a first straight section 1121, a second straight section 1122, and a connecting section 1123 connected and bent between one end of the first straight section 1121 and one end of the second straight section 1122. An end portion of the first straight section 1121 opposite to the connection section 1123 and an end portion of the second straight section 1122 opposite to the connection section 1123 are connected to a power, respectively.

A side surface of the adsorption member 111 where the heating element 112 located is in a longitudinal shape, the first straight section 1121 and the second straight section 1122 extend in the same direction, which is the longitudinal direction of the side surface of the adsorption member 111 where the heating element 112 is located. In general, the adsorption member 111 may be of a cuboid structure, the heating element 112 is formed on a rectangular surface, and both of the first straight section 1121 and the second straight section 1122 extend along a length direction of the rectangular surface of the heating element 112.

Preferably, a first electrode 1124 is connected to the end portion of the first straight section 1121 opposite to the connection section 1123, a second electrode 1125 is connected to the end portion of the second straight section 1122 opposite to the connection section 1123, and the first electrode 1124 and the second electrode 1125 are respectively connected to the power of the power supply assembly 2 to supply power to the heating element 112.

In the embodiment, the side surface of the adsorption member 111 where the heating element 112 located is rectangular. The first electrode 1124 and the second electrode 1125 are respectively located on two opposite sides in the longitudinal direction of the side surface of the adsorption member 111 where the heating element 112 located. More particularly, the first electrode 1124 and the second electrode 1125 are respectively located at a pair of short sides of the rectangular side surface. In other embodiments, the positions of the first electrode 1124 and the second electrode 1125 can also be adjusted correspondingly, and the side surface of the adsorption member 111 where the heating element 112 located can also have other longitudinal shapes such as rhombus, oval and the like.

Two straight sections at two ends of the heating element 112 ensure that the heating track has a long length and a desired resistance value, moreover, disposing the connecting section 1123 only at the middle reduces the bending times and the bending length of bending sections, and avoids excessive concentration of heat at the bending sections, as a result, over-high temperature is avoided, with atomization being more uniform and energy saved.

In some embodiments, the connecting section 1123 includes a curved segment 1126 in a curved shape, and a straight section 1127 in a straight shape. Typically, the connecting section 1123 may include at least one curved segment 1126 and at least one straight segment 1127, each of the curved segment 1126 and the straight segment 1127 is sequentially connected to form the connecting section 1123 which is bent. The curved section 1126 and the straight section 1127 are combined and connected, so that the positions of two ends of the connecting section 1123 can be adjusted according to the position changes of the first straight section 1121 and the second straight section 1122, thereby satisfying the requirements of heating elements 112 with different shapes.

The pore diameter of the minute voids in the porous ceramic ranges from 1 μm to 100 μm, and the average pore diameter of the porous ceramic is 20 μm to 25 μm. Preferably, the minute voids in the porous ceramic have an average pore diameter of 10 μm to 35 μm, and the volume of minute voids having a pore diameter of 5 μm to 30 μm in the porous ceramic accounts for 60% or more of the volume of all minute voids in the porous ceramic.

The volume of minute voids with pore diameters of 10 μm to 15 μm in the porous ceramic accounts for more than 20% of the volume of all minute voids in the porous ceramic, the volume of minute voids with pore diameters of 30 μm to 50 μm in the porous ceramic accounts for about 20-40% of the volume of all minute voids in the porous ceramic, and the porosity of the porous ceramic is 30-70%.

Porosity refers to the ratio of the total volume of minute voids in a porous substrate to the total volume of the porous substrate. The value of the porosity can be adjusted according to the composition of the aerosol-generating substrate, for example, the aerosol-generating substrate with a greater viscosity may have a higher porosity to ensure the liquid delivering effect. Preferably, the porosity of the porous ceramic is 50-60%.

It is to be understood that the above-mentioned technical features can be used in any combination without limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A heating assembly, used for an atomizer, comprising:
an adsorption member, and
at least one heating element for generating heat when electrified;
wherein the adsorption member comprises at least one surface defining at least one fixing groove therein, and the at least one heating element is disposed in the at least one fixing groove, and
wherein the adsorption member is a porous substrate,
the heating element is higher than an outer edge of the fixing groove; or the heating element is flush with an outer edge of the fixing groove.

2. The heating assembly of claim 1, wherein a number of the at least one heating element is one, and a number of the at least one fixing groove is one; the heating element fills the fixing groove.

3. The heating assembly of claim 1, wherein the shape and dimension of the at least one fixing groove are matched with that of the at least one heating element.

4. The heating assembly of claim 1, wherein the porous substrate is a porous ceramic.

5. The heating assembly of claim 4, wherein minute voids in the porous ceramic have pore diameters ranging from 1 μm to 100 μm and an average pore diameter of 10 μm to 35 μm; and a volume of the minute voids having pore diameters of 5 μm to 30 μm in the porous ceramic accounts for more than 60% of a volume of all the minute voids in the porous ceramic.

6. The heating assembly of claim 1, wherein the heating element comprises a first straight section, a second straight section, and a connecting section connected and bent between one end of the first straight section and one end of the second straight section.

7. The heating assembly of claim 6, wherein a side surface of the adsorption member where the heating element located is in a longitudinal shape, the first straight section and the second straight section extend in the same direction, which is the longitudinal direction of the side surface of the adsorption member where the heating element is located.

8. The heating assembly of claim 6, wherein the connecting section comprises a curved segment in a curved shape and a straight segment in a straight shape; the connecting section comprises at least one curved segment and at least one straight segment, and each of the curved segment and the straight segment is sequentially connected to form the connecting section.

9. The heating assembly of claim 6, wherein an end portion of the first straight section opposite to the connection section and an end portion of the second straight section opposite to the connection section are connected to a power, respectively.

10. The heating assembly of claim 9, wherein a first electrode is connected to the end portion of the first straight section opposite to the connecting section, a second electrode is connected to the end portion of the second straight section opposite to the connecting section, and the first electrode and the second electrode are respectively positioned on two opposite sides in the longitudinal direction of the side surface of the adsorption member where the heating element is located.

11. An atomizer, comprising:
the heating assembly of claim 1.

12. The atomizer of claim 11, wherein a number of the at least one heating element is one, and a number of the at least one fixing groove is one; the heating element fills the fixing groove.

13. The atomizer of claim 11, wherein the shape and dimension of the at least one fixing groove are matched with that of the at least one heating element.

14. The atomizer of claim 11, wherein the adsorption member is a porous substrate, and the porous substrate is a porous ceramic.

15. An electronic cigarette, comprising:
the atomizer of claim 11.

16. The electronic cigarette of claim 15, wherein the number of the at least one heating element is one, and the number of the at least one fixing groove is one; the heating element fills the fixing groove.

17. The electronic cigarette of claim 15, wherein the shape and dimension of the at least one fixing groove are matched with that of the at least one heating element.

* * * * *